Jan. 31, 1961
B. M. THOMANN
2,969,961
MIXER
Filed April 14, 1958
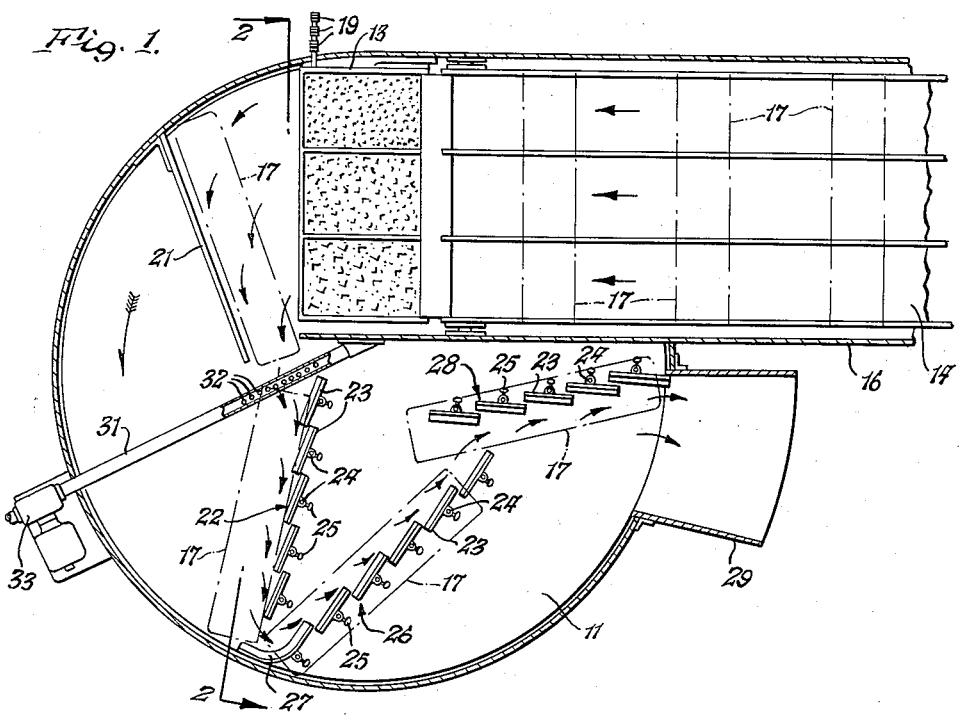
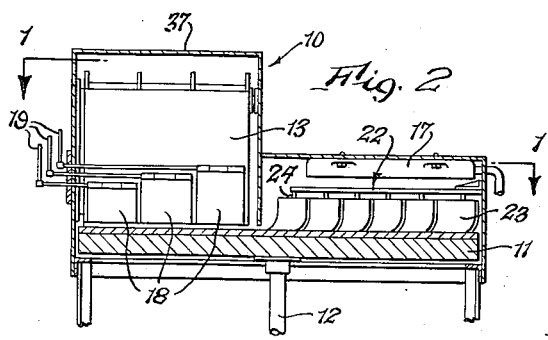
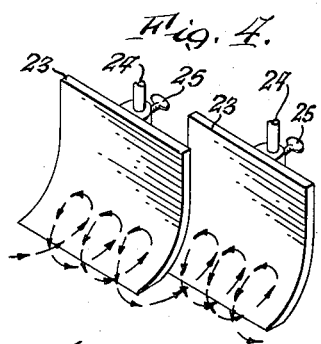
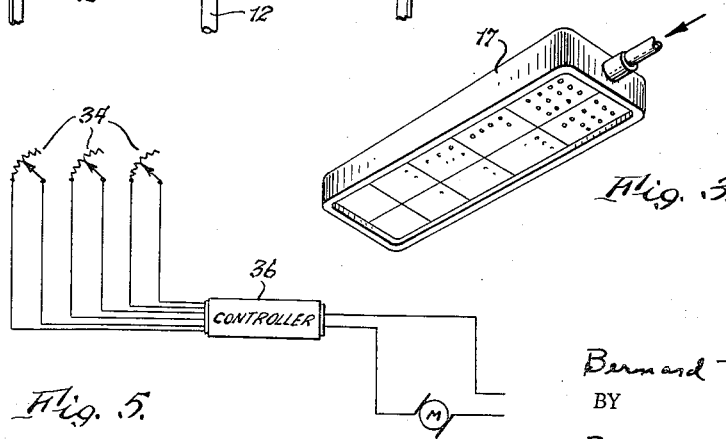
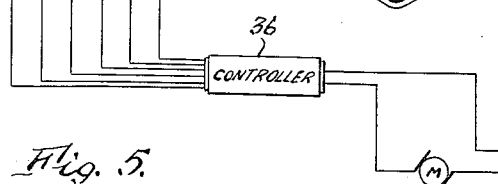
INVENTOR.
Bernard M. Thomann
BY
Papp and Sommer
ATTORNEYS.

United States Patent Office 2,969,961
Patented Jan. 31, 1961

2,969,961

MIXER

Bernard M. Thomann, 1920 Colvin Blvd.,
Tonawanda, N.Y.

Filed Apr. 14, 1958, Ser. No. 728,327

6 Claims. (Cl. 259—157)

This invention relates to mixing apparatus, and more particularly to a mixer for use in preparing road surfacing compositions.

In the road building art it has become common practice to utilize a material in the form of an aggregate which is composed of crushed stone, or the like, and a binder, which material is sometimes referred to as asphalt, or "black-top," for constructing, resurfacing, or repairing roadways. The methods and apparatus used heretofore in the preparation of such road surfacing material, have not been entirely satisfactory, and of a complicated and expensive nature, especially if large amounts of material were to be prepared. Such methods and apparatus did not fully solve the problems encountered, such as producing material of uniform composition and consistency, and maintaining the proper temperature to avoid balling and setting before the material was used.

A mixing apparatus embodying the principles of the present invention solves many of the problems encountered, and may be used to efficiently prepare road surfacing material, which apparatus will automatically produce material of uniform composition and consistency, and also maintain proper temperature to avoid balling, or setting before the material is used. The mixing apparatus of the invention has adjusting means for mixing road surfacing compositions of many different ingredient proportions, and at small or large volume production rates. The mixing apparatus of the invention will also function to provide a continuous mixing process, wherein raw materials are carried to the apparatus, are automatically mixed to predetermined composition and consistency, and the resultant mixture is fed from the apparatus for ready use in road surfacing operations. In addition, the mixing apparatus of the invention can reduce to a considerable extent the dust and noxious fumes often generated during mixing of road surfacing compositions.

The main object of this invention is to provide mixing apparatus for use in preparing road surfacing compositions, which apparatus will automatically produce material of uniform composition and consistency, and at small or large production rates.

Another object of this invention is to provide mixing apparatus for preparing road surfacing compositions wherein proper temperature is maintained to avoid balling or setting of the material during mixing and before it is used.

Still another object of the invention is to provide a mixing apparatus which reduces to a considerable extent the dust and noxious fumes often generated during the mixing of road surfacing compositions.

These and further objects and features of the invention will become more apparent from the following description and accompany drawing wherein;

Fig. 1 is a sectionalized plan view of a mixing apparatus embodying the principles of the invention;

Fig. 2 is a section view, in reduced scale, as seen from line 2—2 in Fig. 1;

Fig. 3 is a perspective view of a gas-fired infra-red heater element used in the mixing apparatus of Fig. 1;

Fig. 4 is a perspective view of mixing blade elements used in the mixing apparatus of Fig. 1, and illustrating the general movement given to the material being mixed; and Fig. 5 is a schematic illustration of an electrical control arrangement which may be used with the mixing apparatus of Fig. 1.

Referring now to the drawing, a mixing apparatus 10 embodying the principles of the invention comprises a circular platform 11, mounted upon a shaft or axle 12, driven by a motor means (not shown) whereby the platform 11 is rotated in a counter-clockwise direction as viewed in Fig. 1. The platform 11 is preferably formed of a material, such as iron, to provide the degree of strength and ruggedness to support, without binding or warping, the material, to be mixed thereon. A compartmentalized hopper 13 is arranged above the platform 11 with its longer axis radially disposed relative to the platform. A belt type conveyor arrangement 14 is positioned to carry material to the top of the hopper 13 and to drop it into the compartments of the hopper. The conveyor may be divided into three sections more or less, so that various types of material, used in the mixture being prepared, may be carried into the hopper. A cover 16, surrounds the conveyor arrangement, which cover has affixed to its inner top surface a plurality of heaters 17, preferably of the gas-fired infra-red radiation type, said heaters being regulated to heat the material being fed into the hopper, for drying and for pre-heating to a temperature best suited for the mixing operation to follow.

The hopper 13, which may be arranged to taper toward its lower end, has a series of slidable doors, or covers 18, each of which is adapted to be opened to any degree by one of a plurality of handle and shaft means 19, to provide a predetermined mixture of material to be released from the hopper 13 upon the platform 11.

An arm, or baffle plate 21, constituting the first baffle plate as set forth in the subsequent claims, is arranged to extend from the periphery of the platform and in the general direction of the center thereof, as best seen in Fig. 1. The purpose of the baffle plate 21 is to direct the material, falling on the platform from the hopper, toward the center region of the platform, as indicated by the arrows. The baffle plate 21 is positioned to scrape the surface of the platform so that the material will be directed toward the center of the platform as the material is brought against the face of the baffle plate by action of the rotating platform. A sectionalized baffle plate arrangement 22, constituting the second baffle plate as set forth in the subsequent claims, is positioned to receive material as it is directed from the baffle plate 21, and to direct movement of said material toward the periphery of the platform 11, as the latter moves the material against the baffle plate 22. The baffle plate arrangement 22 is composed of a plurality of overlapping blades, or plows 23, each of which is affixed to a vertically extending and rotatable shaft 24, adapted to be locked by a set-screw 25. The blades 23, which are angularly adjustable relative to each other, are curved at the lower edge, and are positionable for scraping the surface of the platform, whereby the material moved against each blade 23 will be given a rolling movement, indicated by arrows in Fig. 4, which movement will progress from one blade to the next toward the periphery of the platform. A succeeding baffle plate arrangement 26, constituting the third baffle plate as set forth in the subsequent claims, similar to the baffle plate arrangement 22, but having a sharply curved blade 27 at the outer end thereof, is positioned over the platform as illustrated in Fig. 1. The purpose of the baffle plate arrangement 26, is to receive the material flowing from the end of the baffle plate arrangement 22, and to direct such material back toward the center region of the platform. The baffle plate arrangement 26 includes a plurality of adjustable blades 23, adapted to cause a rolling movement of the material as it is moved therealong by reason of the rotating platform 11.

Another succeeding baffle plate arrangement 28, constituting the fourth baffle plate as set forth in the subsequent claims having a plurality of adjustable blades 23, is arranged to receive material flowing from the end of the baffle plate arrangement 26, and to direct it outwardly toward the periphery of the platform where it flows into a discharge trough 29.

It will be seen that the baffle plate arrangement 22, 26, and 28, constituting the second, third and fourth baffle plates as set forth in the subsequent claims, serve to direct the material in a zig-zag pattern and produce a rolling movement thereof as the material is forced against the baffle plates by action of the rotating platform. In such manner, the material is given a thorough mixing before it is moved into the discharge trough 29.

A liquid spray means in the form of a pipe 31, having a series of openings, or orifices 32, is arranged for directing a flow of binder downwardly upon the platform, and upon the material passing from baffle plate 21 to the baffle plate arrangement 22. Such binder may be of a tar-like substance as commonly used in preparation of road surfacing materials of the type under discussion. The pipe 31 is connected to a motor driven pump 33, which is adapted to pump the binder from a supply source (not shown) upwardly in the pipe and ejecting it through orifices 32. The rate of pump operation may be regulated to supply the required amount of binder to the material passing under the pipe 31, in accordance with the final composition desired in the material being mixed.

Arranged over each of the baffle plates 21, 22, 26, and 28, constituting the first, second, third and fourth baffle plates as set forth in the subsequent claims is a heater 17. The purpose of the heaters is to maintain the necessary temperature as required for the proper mixing and blending of the material being processed. Such temperature should be controlled in accordance with the volume of material being processed, and the rotation speed of the platform 11.

For purpose of automatic operation of the mixer, the handle and shaft means 19 may incorporate an electrical system including rheostats 34, forming parts of a circuit arrangement extending to a controller 36, the latter being adapted to integrate the settings of the rheostats 34 for control of the motor driven pump 33; with such an arrangement, the amount of binder being discharged from the pipe 31, will be regulated in accordance with the mixture of raw material being fed from the hopper 13 upon the platform.

A hood, or cover 37 may be arranged above the platform 11, to enclose the hopper 13, heater 17, and baffle plates 21, 22, 26 and 28 so that any dust and noxious fumes caused during the mixing operation will be confined to the vicinity of the mixing apparatus or if desired, a ventilating system (not shown) may be attached to the cover 37 for carrying away such dust and fumes.

From the foregoing it will be seen that the mixing apparatus of the invention functions to achieve the objectives set forth herewithin, namely, to provide a road surfacing material mixing apparatus to automatically produce material of uniform composition and consistency, and at small or large production rates, wherein balling or setting is avoided, and dust or noxious fumes may be eliminated.

The foregoing description has been given in detail without thought of limitation since the inventive principles involved are capable of assuming other physical embodiments without departing from the spirit of the invention and the scope of the appended claims.

What is claimed is:

1. Mixing apparatus for preparation of road surfacing material comprising a rotatable circular platform, a compartmentalized hopper adapted to receive raw materials for controlled deposit upon the platform, a first baffle plate arranged to extend from the periphery of the platform toward the center region thereof, said baffle plate being further arranged to produce a rolling movement of the material as it engages the material deposited by the hopper and directs it toward the center region of the platform, a second baffle plate arranged to receive material from the first baffle plate and to direct it toward the periphery of the platform and being further arranged to produce a rolling movement of the material as it engages the material, a discharge pipe arranged to discharge a liquid binder upon the material as it moves from the first baffle plate to the second baffle plate, a third baffle plate arranged to receive material from the second baffle plate and to direct it toward the center region of the platform, and being further arranged to produce a rolling movement of the material as it engages the material, and a fourth baffle plate arranged to receive material from the third baffle plate and to direct it toward the periphery of the platform, and being further arranged to produce a rolling movement of the material as it engages the material.

2. Mixing apparatus according to claim 1, wherein an infra-red radiation heating unit is positioned above each baffle plate to maintain the material being moved therealong at a predetermined temperature.

3. Mixing apparatus according to claim 2, wherein a cover means is arranged to enclose the platform, hopper, baffle plates, discharge pipe and heating units.

4. Mixing apparatus according to claim 3, wherein means are provided for automatic adjustment of the spray of liquid binder in accordance with the composition and volume of material being mixed upon the platform.

5. Mixing apparatus for preparation of road surfacing material comprising a rotatable circular platform, a compartmentalized hopper adapted to receive raw materials for controlled deposit upon the platform, a conveyer arrangement adapted to supply the hopper with material to be mixed, a first baffle plate arranged to extend from the periphery of the platform toward the center region thereof, said baffle plate being further arranged to produce a rolling movement of the material as it engages the material deposited by the hopper and directs it toward the center region of the platform, a second baffle plate arranged to receive material from the first baffle plate and to direct it toward the periphery of the platform and being further arranged to produce a rolling movement of the material as it engages the material, a third baffle plate arranged to receive material from the second baffle plate and to direct it toward the center region of the platform, and being further arranged to produce a rolling movement of the material as it engages the material, and a fourth baffle plate arranged to receive material from the third baffle plate and to direct it toward the periphery of the platform, and being further arranged to produce a rolling movement of the material as it engages the material.

6. Mixing apparatus for preparation of road surfacing material, comprising a rotatable platform, means depositing a controlled amount of material on said platform, a plurality of baffle plates in scraping engagement with the working surface of the platform and adapted to effect a rolling movement of the material upon the platform, a liquid discharging means arranged to add a liquid binder to the material under movement upon the platform, and a plurality of infra-red radiation heater units arranged downstream from said liquid discharging means and above the mixed material and liquid binder and subjecting the upper surface of mixed material and liquid binder to the effect of the downwardly directed heat and light from said units.

References Cited in the file of this patent

UNITED STATES PATENTS

| | | |
|---|---|---|
| 414,632 | Crail | Nov. 5, 1889 |
| 490,631 | Ransome | Jan. 24, 1893 |
| 879,808 | Besser | Feb. 18, 1908 |
| 953,961 | Lancaster | Apr. 5, 1910 |
| 1,231,790 | Richards | July 3, 1917 |
| 1,358,045 | Woodhull | Nov. 9, 1920 |
| 1,531,387 | Gettings et al. | Mar. 31, 1925 |
| 2,092,282 | Love | Sept. 7, 1937 |
| 2,190,044 | Pollitz | Feb. 13, 1940 |
| 2,626,875 | McConnaughay | Jan. 27, 1953 |